(12) United States Patent
Woergoetter et al.

(10) Patent No.: US 7,558,634 B2
(45) Date of Patent: Jul. 7, 2009

(54) CONTROLLER AND METHOD OF CONTROLLING AN APPARATUS USING PREDICTIVE FILTERS

(76) Inventors: Florentin Woergoetter, 114 Ochiltree Dr., Dunblane FK 15 (GB); Bernd Porr, 87D Port Street, Stirling FK8 2ER (GB)

(*) Notice: Subject to any disclaimer, the term of this patent is extended or adjusted under 35 U.S.C. 154(b) by 331 days.

(21) Appl. No.: 11/513,681

(22) Filed: Aug. 30, 2006

(65) Prior Publication Data

US 2008/0091282 A1 Apr. 17, 2008

Related U.S. Application Data

(63) Continuation of application No. 10/479,741, filed as application No. PCT/GB02/02571 on Jun. 5, 2002, now Pat. No. 7,107,108.

(30) Foreign Application Priority Data

Jun. 5, 2001 (GB) .................................. 0113627.4

(51) Int. Cl.
*G05B 13/02* (2006.01)
*G06F 15/18* (2006.01)
*G06F 17/00* (2006.01)
*G06N 7/00* (2006.01)
*G06N 7/08* (2006.01)

(52) U.S. Cl. .............................. 700/39; 700/45; 700/51; 700/55; 706/21; 706/22; 706/23; 706/58

(58) Field of Classification Search .................. 700/28, 700/29, 32, 33, 37–39, 44, 45, 47, 51, 54, 700/55; 706/14, 21–23, 58; 318/561
See application file for complete search history.

(56) References Cited

U.S. PATENT DOCUMENTS

| | | |
|---|---|---|
| 3,013,721 A | 12/1961 | Foster et al. |
| 3,862,403 A | 1/1975 | Kurihara |
| 4,389,618 A | 6/1983 | Bauman |
| 4,518,866 A | 5/1985 | Clymer |
| 4,634,946 A | 1/1987 | Moulds et al. |

(Continued)

FOREIGN PATENT DOCUMENTS

| | | |
|---|---|---|
| DE | 4340746 | 6/1994 |
| DE | 10038444 | 2/2002 |
| EP | 0334698 | 9/1989 |
| EP | 1030231 | 8/2000 |
| EP | 1179671 | 8/2001 |

(Continued)

OTHER PUBLICATIONS

International Search Report based on Application No. PCT/GB 02/02571, Sep. 24, 2002.

(Continued)

*Primary Examiner*—Crystal J Barnes Bullock

(57) ABSTRACT

In the field of electronic or computerized control apparatuses, known methods of compensating for disturbance signals rely on less than ideal analytical or empirical models. There is provided a controller (200) or method of controlling which observes and learns the correlation between various measured signals and automatically learns how to control the apparatus. It has a primary input ($x_R$) for the measured state of the apparatus, and signal processing means (604, 606) responsive to the input signal for generating a control signal (V) to maintain the apparatus in a desired state, the controller (200) having further input(s) ($X_1$, $X_a$) for additional measurements of the apparatus or its environment the signal processing means using a weighted average (606) of results of different fixed impulse responses (611-615) to each input to modify the control signal, and means (630, 800, 802) for conditioning the response automatically in response to temporal cross-correlation observed between the measurement signal(s) and the control signal. The controller can be pre-taught with an appropriate response, or it can learn it during initial operation.

41 Claims, 8 Drawing Sheets

U.S. PATENT DOCUMENTS

| | | | |
|---|---|---|---|
| 4,663,703 A | | 5/1987 | Axelby et al. |
| 4,698,745 A | | 10/1987 | Hiroi et al. |
| 4,714,988 A | | 12/1987 | Hiroi et al. |
| 4,809,330 A | * | 2/1989 | Tanaka et al. ............... 704/216 |
| 5,146,414 A | * | 9/1992 | McKown et al. .............. 702/49 |
| 5,159,660 A | | 10/1992 | Lu et al. |
| 5,235,646 A | * | 8/1993 | Wilde et al. ................... 381/17 |
| 5,311,421 A | | 5/1994 | Nomura et al. |
| 5,404,289 A | | 4/1995 | Hang et al. |
| 5,412,584 A | | 5/1995 | Umeno et al. |
| 5,490,505 A | | 2/1996 | Diab et al. |
| 5,513,098 A | | 4/1996 | Spall et al. |
| 5,517,418 A | | 5/1996 | Green et al. |
| 5,519,605 A | | 5/1996 | Cawlfield |
| 5,521,946 A | | 5/1996 | Main |
| 5,570,282 A | | 10/1996 | Hansen et al. |
| 5,704,011 A | | 12/1997 | Hansen et al. |
| 5,710,500 A | | 1/1998 | Matsuo et al. |
| 5,719,788 A | * | 2/1998 | Seborg et al. ............... 702/179 |
| 5,761,918 A | * | 6/1998 | Jackson et al. ................ 62/181 |
| 5,822,740 A | | 10/1998 | Haissig et al. |
| 5,893,055 A | * | 4/1999 | Chen .......................... 702/189 |
| 6,055,524 A | | 4/2000 | Cheng |
| 6,064,916 A | * | 5/2000 | Yoon ............................ 700/44 |
| 6,064,997 A | | 5/2000 | Jagganathan et al. |
| 6,094,602 A | | 7/2000 | Schade |
| 6,125,124 A | | 9/2000 | Junell et al. |
| 6,181,975 B1 | | 1/2001 | Gross et al. |
| 6,182,001 B1 | * | 1/2001 | Sugai et al. ................... 701/78 |
| 6,185,309 B1 | | 2/2001 | Attias |
| 6,314,127 B1 | * | 11/2001 | Lynch et al. ................ 375/144 |
| 6,445,963 B1 | | 9/2002 | Blevins et al. |
| 6,577,908 B1 | | 6/2003 | Wojsznis et al. |
| 6,594,605 B2 | * | 7/2003 | Kurosawa .................... 702/106 |
| 6,611,319 B2 | * | 8/2003 | Wang .......................... 356/28 |
| 6,658,304 B1 | | 12/2003 | Molander et al. |
| 6,754,542 B1 | | 6/2004 | Tanaka |
| 6,772,036 B2 | | 8/2004 | Eryurek et al. |
| 6,937,909 B2 | | 8/2005 | Seem |
| 6,937,910 B2 | | 8/2005 | Petersson et al. |
| 6,967,988 B1 | * | 11/2005 | Wedding ..................... 375/142 |
| 2002/0191711 A1 | | 12/2002 | Weiss et al. |

FOREIGN PATENT DOCUMENTS

| | | |
|---|---|---|
| JP | 58165106 | 3/1982 |
| WO | WO0135175 | 5/2001 |
| WO | 02/099544 | 12/2002 |

OTHER PUBLICATIONS

International Preliminary Examination Report based on Application No. PCT/GB 02/02571, University of Sterling, et al.

Bozic, "Digital and Kalman Filtering," published 1994 by Edward Arnold, Chapter 7, Recursive Estimation.

Preliminary Amendment filed in related U.S. Appl. No. 10/479,741, now Patent No. 7,107,108, issued Sep. 12, 2006.

Office Action mailed Oct. 13, 2005 in related U.S. Appl. No. 10/479,741, now Patent No. 7,107,108, issued Sep. 12, 2006.

Response of Feb. 10, 2006 to Office Action mailed Oct. 13, 2005, in related U.S. Appl. No. 10/479,741, now Patent No. 7,107,108, issued Sep. 12, 2006.

Comments on Statement of Reasons for Allowance, filed with Issue Fee Jul. 20, 2006, in related U.S. Appl. No. 10/479,741, now Patent No. 7,107,108, issued Sep. 12, 2006.

"International Search Report Based on EP Application No. 07100308.1".

Elliott, "Optimal Controllers and Adaptive Controllers for Multichannel Feedforward Control of Stochastic Disturbances", *IEEE Transactions on Signal Processing, vol. 48, No. 4*, (Apr. 2000), 1053-1060.

"International Search Report Based on EP Application No. 07100309.9", (May 2, 2007).

"Notice of Allowability in related patent application no. 10/479,741", (Sep. 12, 2006).

* cited by examiner

CONTROLLER AND METHOD OF CONTROLLING AN APPARATUS USING PREDICTIVE FILTERS

CROSS-REFERENCE TO RELATED APPLICATIONS

This is a Continuation Patent Application of U.S. application Ser. No. 10/479,741, filed Sept. 15, 2004, now U.S. Pat. No. 7,107,108 which is a National Phase Application of PCT International Application No. PCT/GB02/02571, International Filing Date Jun. 5, 2006, claiming priority of GB Patent Application No. 0113627.4, filed Jun. 5, 2001.

BACKGROUND

This invention relates to control methods and apparatuses, and in particular to electronic or computerised control apparatuses incorporating predictive electronic filters.

1. Field

Many types of control system are known and implemented in all manner of consumer and industrial machines and in industrial processes. These control systems are invariably based on a closed loop in which a control variable is sensed, compared with a desired or set value to derive an error signal, and a correlation applied in response to the error signal, hopefully to drive the error to zero. The stability of the control system is paramount, however, and filter functions are included in the feedback paths implicitly or explicitly to maintain stability. Over the years, many additional feedback and "feed-forward" mechanisms have evolved to improve the performance of control systems, particularly in their speed of response. However, the need for stability limits these approaches in a well-known manner, particularly when filter functions have to be calculated and implemented allowing for variations and tolerances in a range of conditions.

2. Brief Description of Related Art

It has been recognised that many control systems are influenced by measurable "disturbance" factors in the environment, which can be measured independently of the main control variable. Some prior attempts have been made to include the compensation of disturbance signals within the control system. These are limited in their applicability, however, because they rely on analytical or empirical models of the process being controlled, which are not always available, or, more importantly, are not stable between samples, or over time. It would be desirable to provide a control system which can observe and learn the correlation between various signals, and learn automatically to control the apparatus better as a result.

The goal of all electronic filters is to separate the desired signal from all other signal components, called noise. Predictive adaptive filters are also known and exploit the fact that a signal is usually changing slowly compared to the change of the additive noise. This is due to noise comprising all frequencies, while signals comprise predominantly low frequencies. Initially such an adaptive filter has a pre-defined setting but this setting will then continuously adapt to the changing signal, seeking to eliminate the noise in an optimal manner. This is achieved by comparing the momentarily arriving signal to the signal of the immediate past by means of an intrinsically built in mechanism, which can be pictured as an auto-correlation. Such filters react to changes in the signal to adapt the filter settings accordingly. As a consequence such filters are able to predict (extrapolate) the shape of the input signal for the immediate future, with decreasing prediction reliability for increasing temporal (predictive) intervals.

One class of adaptive predictive filter is the Kalman-type filters, which are able to adapt to the characteristics of an input signal using recursive estimation. By such an adaptation mechanism these filters remain optimally tuned to their respective task. Due to the extent to which analogue electronic signals are disturbed by noise, such predictive adaptive filters have a broad application domain in all fields of analogue electronic signal processing, for example, telecommunication, broadcasting, radar signal processing and many more. These filters, however, rely on the self-similarity of the input signal (that is, they are optimised to respond to particular characteristics of the expected signal). Their aim is to preserve a maximum amount of information from the input signal. Thus, the output signal is usually only an improved version of the original signal derived directly from the input. Accordingly, the Kalman filter, although interesting in itself, does not offer a solution to the problems of complex, control systems.

BRIEF SUMMARY

The invention provides a controller for controlling a physical apparatus, the controller comprising first input means for receiving a primary input signal representing a measured state of the apparatus, and signal processing means responsive to said primary input signal for generating a control signal for influencing the state of the apparatus so as to maintain a desired state, the controller having at least one further input for a signal representing additional measurements of the apparatus or its environment, said signal processing means including correcting means for including corrections in said control signal in response to said additional measurement signal, and means for conditioning the response of said correcting means automatically in response to temporal cross-correlation observed between said additional measurement signal and said control signal observed during operation of the controller and apparatus together.

The conditioning means may comprise means for adjusting a gain and frequency response of a signal path in the correcting means. Such an adjustment is similar to that implemented in a Kalman filter.

In a preferred embodiment, however, the correcting means comprises means for filtering the additional signal via a plurality of filters having different fixed impulse responses and means for forming a weighted sum of the differently filtered signals to derive the correction to be applied, the conditioning means comprising means for adjusting the weightings of the different signal paths in response to their respective observed correlation with the control signal.

The inventors refer to the correcting and conditioning means in this case as a cross-modal predictive filter (CMP filter). The correcting and conditioning means in this case also has similarities with the well-known "neural network" circuits, in which cross-correlation between desired outputs and a set of inputs is learned from a number of sample patterns. However, whereas the individual input signals coming from respective sensors as in the neural network, they are in this case signals from the same sensor, but subject to different filter responses. By learning the pattern of correlation between these signals and the control signal, the novel controller effectively learns the temporal correlation between the additional measurement signal and the control signal.

The conditioning means may be arranged to observe said correlation by multiplying the signal of each path with a derivative of the control signal and integrate the product of said signals over time to derive said weighting. The integration may be lossy or not lossy, depending on the whether the conditioning is to be held forever in the absence of stimulation, or is to be allowed to decay. The integration does not need to be lossy in order for the CMP filter to be capable of adapting to temporal changes in the disturbances.

The controller may have plural additional inputs, each with associated correcting means and conditioning means within the signal processing means.

In embodiments where the correcting means has a plurality of filters of different impulse responses, the correcting means for each additional signal need not all have the same number of filters, nor the same set of impulse responses. The number of filter paths can thus be reduced if the designer has some idea of the range of correlation expected.

The controller may be arranged to generate plural control signals based on at least some of the same input signals, the signal processing means including correcting means and conditioning means for generation of each control signal.

The plural correcting means may share filter components.

In embodiments arranged to generate plural control signals, a first control signal may be connected to serve as an additional measurement input to the correcting means for generating a second control signal. A derivative or other transformation may be applied to any of the measurement inputs, as appropriate to the application.

The invention further provides a method of controlling a physical apparatus, the method comprising on a continuous basis:

receiving a primary input signal representing a measured state of the apparatus, generating a control signal for influencing the state of the apparatus in response to said primary input signal so as to maintain a desired state; and receiving at least one further input for signal representing additional measurements of the apparatus or its environment, including corrections in said control signal in response to said additional measurement signal, and conditioning the response of said correcting means automatically in response to temporal cross-correlation observed between said additional measurement signal and said control signal observed during operation of the controller and apparatus together.

The correcting step may comprise filtering the additional signal via a plurality of filter functions having different fixed impulse responses, and forming a weighted sum of the differently filtered signals to derive the correction to be applied, the conditioning step comprising adjusting the weightings of the different signal paths in response to their respective observed correlation with the control signal.

The conditioning step may begin from a zero condition, or may begin with a set of conditions learned in another apparatus.

The invention further provides a controller of the type set forth above, wherein the correcting means is replaced by one having a fixed response, but one which has been transferred from another controller which has learned the response in operation. Whether this is practical will depend on the repeatability of the environment and the characteristics of the apparatus under control.

A further alternative is to transfer learning from one controller into another controller as a starting condition, the other controller then being able to adjust the response of the correcting means during its continuing operation.

BRIEF DESCRIPTION OF THE DRAWINGS

Embodiments of the invention will now be described, by way of example only, with reference to the accompanying drawings, in which.

DETAILED DESCRIPTION OF THE EMBODIMENTS

This invention is not specifically limited to embodiment in either analogue or digital hardware, or software. The following description is generally valid for either implementation, special differences being pointed out as required. The mixture of analogue and digital circuits, and of hardware and software, which is used in a given application will depend on many factors familiar to the skilled person. Such factors include the bandwidth required for the system, the relative development costs of the different solutions, and the expected scale of production.

The following descriptions of classical mechanical and chemical plant control problems describe how use of a cross-modal predictive filter can be used to provide an improved multi-modal control system which learns from experience the correlations, particularly in the time domain, between multiple inputs and the desired corrections.

In a typical mechanical system comprising a controller and a mechanical actuator, the position of the actuator will change due to internally generated and external (disturbing) forces. In the classical closed loop paradigm, actuator position is measured by a position-sensor, the signal from which is used by way of closed loop control to compensate for the internal forces that determine the mechanical motion pattern of the actuator. If an external force (disturbance) upsets the position, the control generates a signal to compensate. However, the combined inertia of the actuator and controller induces a time lag in the compensation used to counteract that disturbance, resulting in a significant position error during the compensation (transition) period.

Essentially the same problems arise in industrial processes generally, for example the chemical industry.

Figure 1:
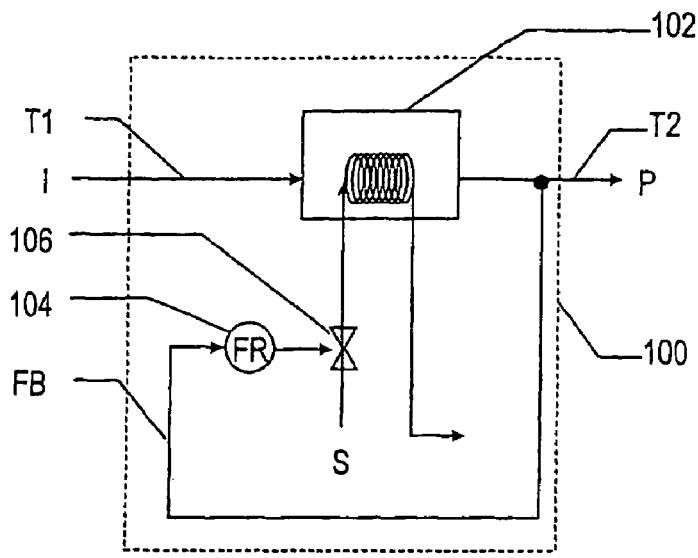
FIG. 1 is a generalised block diagram of a conventional chemical processing plant, showing a typical closed loop control system.

FIG. 1 represents a typical process 102 transforming a starting substance I into a product P by means of heat-controlled reaction. As shown in FIG. 1, the starting substance normally enters the process with temperature T1. The optimal output is reached at T2. The complete plant 100 comprises control systems for maintaining the various parameters at their optimum levels to ensure process stability. Temperatures T2 is fed back as signal FB and used as the set point in a conventional closed loop controller to control the flow rate 104 via valve 106 of the steam S that heats the plant. The output temperature T2, however, will change if T1 is fluctuating due to a disturbance, which will lead to a sub-optimal situation. Known methods for overcoming these problems are by a heuristic addition of the effect of T1 to the input side of the feed-back loop. This, however, can only be achieved if the relation between input and output variables are known in a deterministic way. Complex systems have been devised that address these problems, but, as described earlier, these have their disadvantages in terms of complexity, requirement for known models and loop instability.

Figure 2:
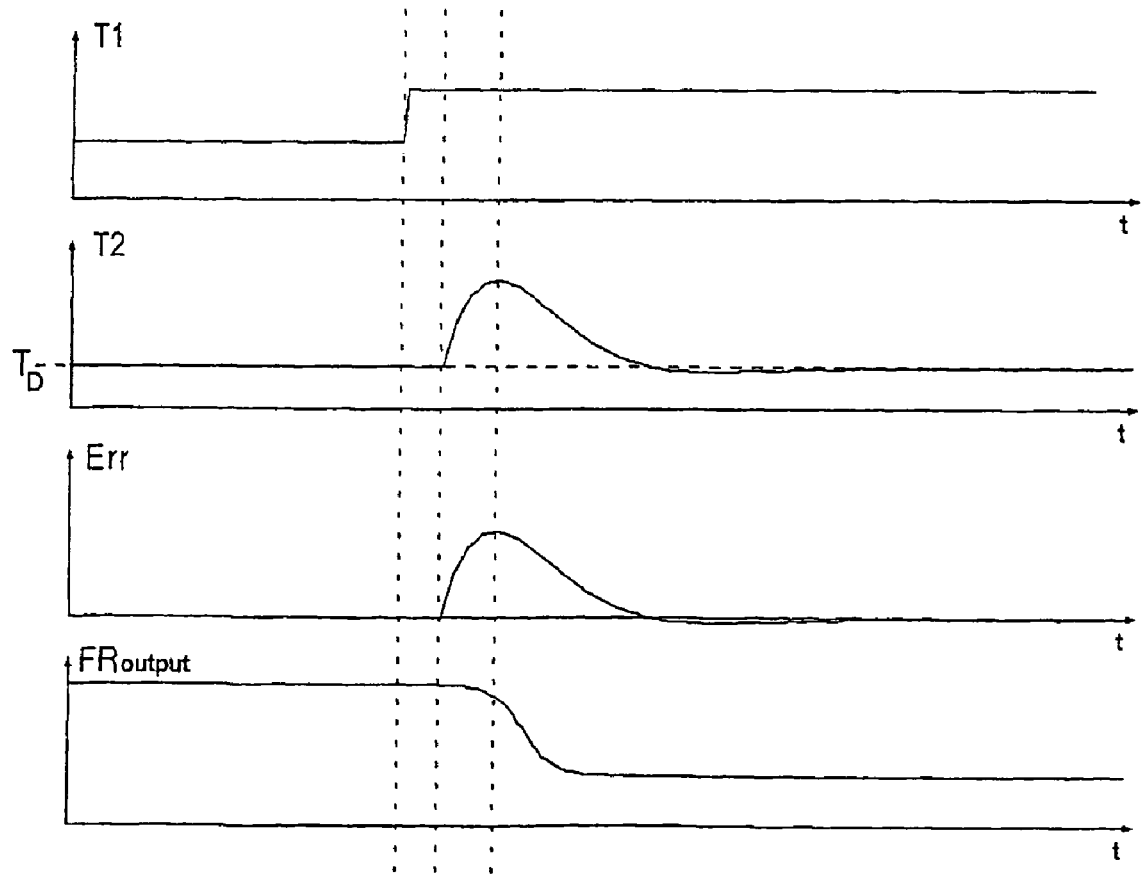
FIG. 2 shows schematically the values of certain signals over time in a typical closed loop control system responding in a reactive manner to an external disturbance.

FIG. 2 provides a graph showing schematically values of demanded, actual and error values (T.sub.D, T2 and Err respectively) during the transition period of the chemical process closed loop control system, following a step change (disturbance) in the input temperature T1. T.sub.D represents the set or demand value for T2. One can observe the lag caused by the response time of T2 to the variation in T1, and the time it takes for the system to adapt to the change by changing the flow rate FR of the steam S to bring T2 back to the demand value T.sub.D. During the transition period some of the process parameters will be at their non-optimum settings, impacting the quality of the heat controlled reaction and its resultant output.

Figure 3:
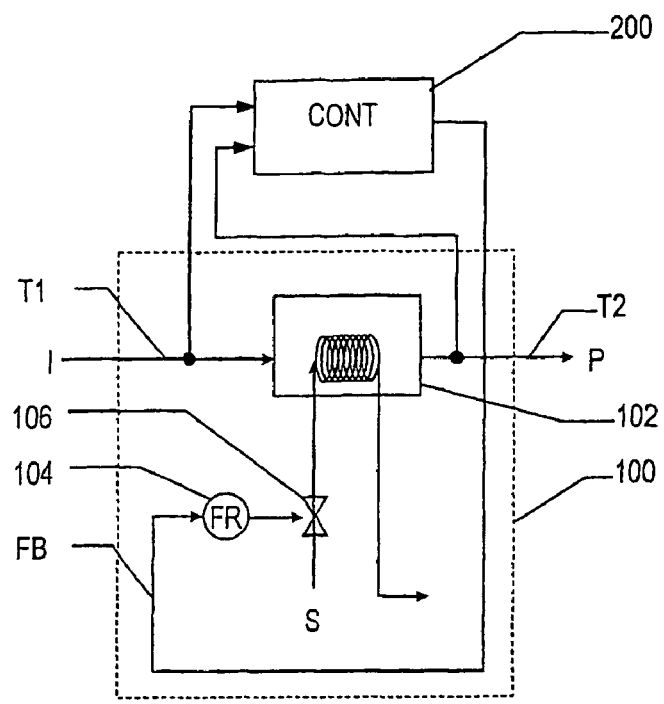
FIG. 3 shows the chemical processing plant of FIG. 1 modified with a CMP filter-based controller performing closed loop control of the steam entering the plant based on both the input and the output parameters of the plant.
Figure 4:
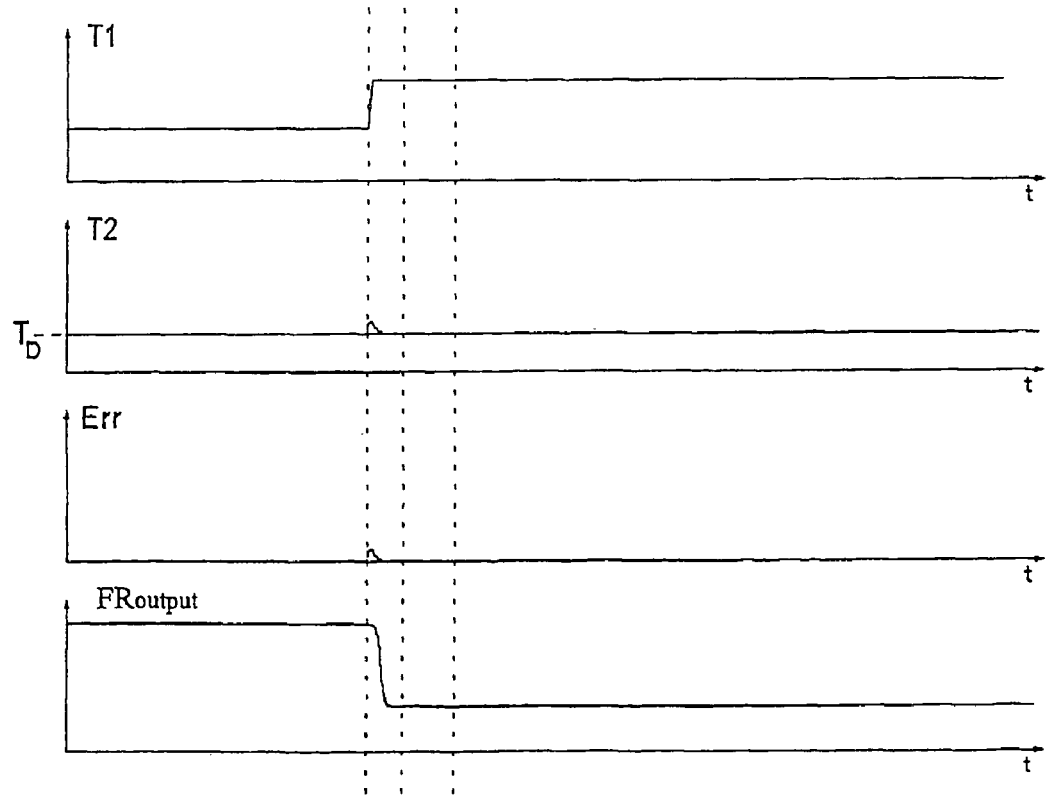
FIG. 4 shows the signals corresponding to those in FIG. 2, in a closed loop control system using a cross-modal predictive filter responding directly to the same external disturbance after a learning phase.

FIG. 3 shows a modified control system in which a controller 200 receives not only the output signal T2, but also receives the "disturbance" signal T1. The exact causal relationship between variations in T1 and the output signal T2 is unknown, when the system is designed and set up. However, the novel controller 200 learns by an adaptive process to correlate an initially unknown change in T1 (disturbance) with the delayed change in T2. The exact implementation of this is not described here, but is described below with reference to FIGS. 5 to 10. Once the controller has adapted to the disturbance, at the instant a change in T1 is observed, valve 106 will be adjusted by signal FB to alter the flow rate FR to a pre-compensating setting. Thus, the plant 100 will be capable of responding directly to the disturbance in T1, anticipating the resultant effect on T2 and consequently the error in T2 (and its negative effect upon the process) will be greatly diminished, as shown in FIG. 4.

In the simple example of FIGS. 1 and 3, the number of variables being controlled and being measured is very small. In general terms, the novel type of controller can be designed to compare any number of different input signals and, by an adaptive process, learn to predict the output by observing the cross-correlation properties between the inputs and the output signal. The controller in particular can learn from its observations which of the numerous input signals is relevant to prediction of the output signal, and in what way. Embodiments of the invention include a cross-modal predictive (CMP) filter built into the control loop, which receives multiple inputs. After a learning period, the CMP filter will predict an output event (output signal) by responding to the earliest occurring relevant input that consistently precedes the related output signal.

The construction of the novel controller, both in general and in a specific example, will be described below with reference to FIGS. 5 to 13. Applying the novel controller firstly to the previous example of a classical mechanical problem, the CMP filter would measure the external forces (disturbances) and—during the adaptive process—temporally correlate them to the (much later occurring) position change. Once the filter has adapted to the disturbances a position correction signal (a counter force) can be generated as soon as an external force occurs, without having to wait until a lagging position-error is detected at the output. Thus, the system will be capable of responding immediately to the application of an external force and the position error will be greatly diminished.

Figure 5:
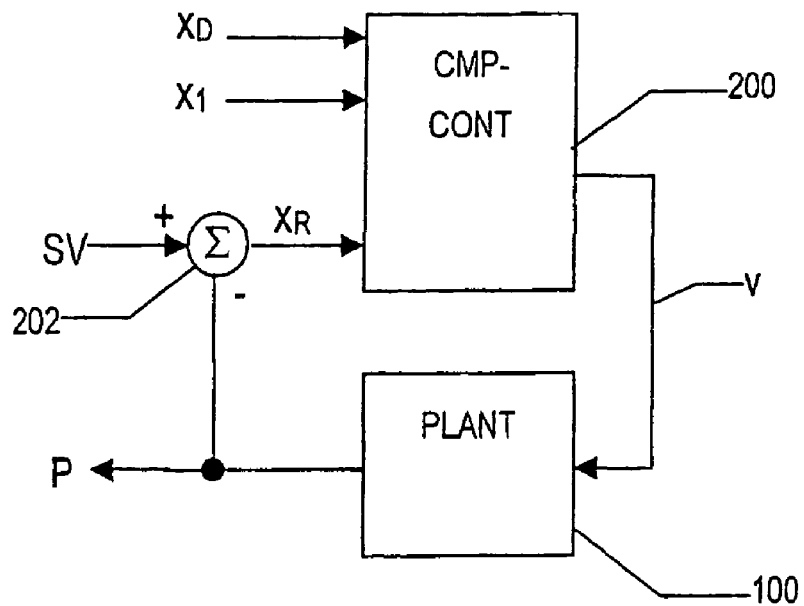
FIG. 5 is a schematic block diagram of a generalised process control system incorporating a CMP-filter based controller according to a generalised embodiment of the present invention.

FIG. 5 shows a CMP filter-based controller 200 in a typical closed-loop configuration, that is, with an output demand value v fed into and adjusting the operational setting of the controlled apparatus, here represented by generalised plant 100. A reference signal P representing the current actual state of plant 100 is subtracted 202 from a desired (set) value SV (which can be zero), to provide a difference or error term $x_R$, which is fed back into the controller, where it is used to define the output demand value, thereby "closing" the control loop. To exploit the multi-modal capabilities of controller 200, a number of external disturbance inputs $x_1 \ldots x_N$ are also fed into the controller. These are derived from sensors throughout the plant 100 and comprise voltage time-functions of arbitrary shape.

The plant 100 has to be specified according to the actual application domain, for example a force-position transformation as described in the earlier mechanical example, or a steam-heating device as described in the earlier chemical processing plant example. The skilled person will readily appreciate that the principles of the novel controller are applicable in a wide range of "physical" apparatuses and systems, from classic machines to economic systems.

Figure 6:
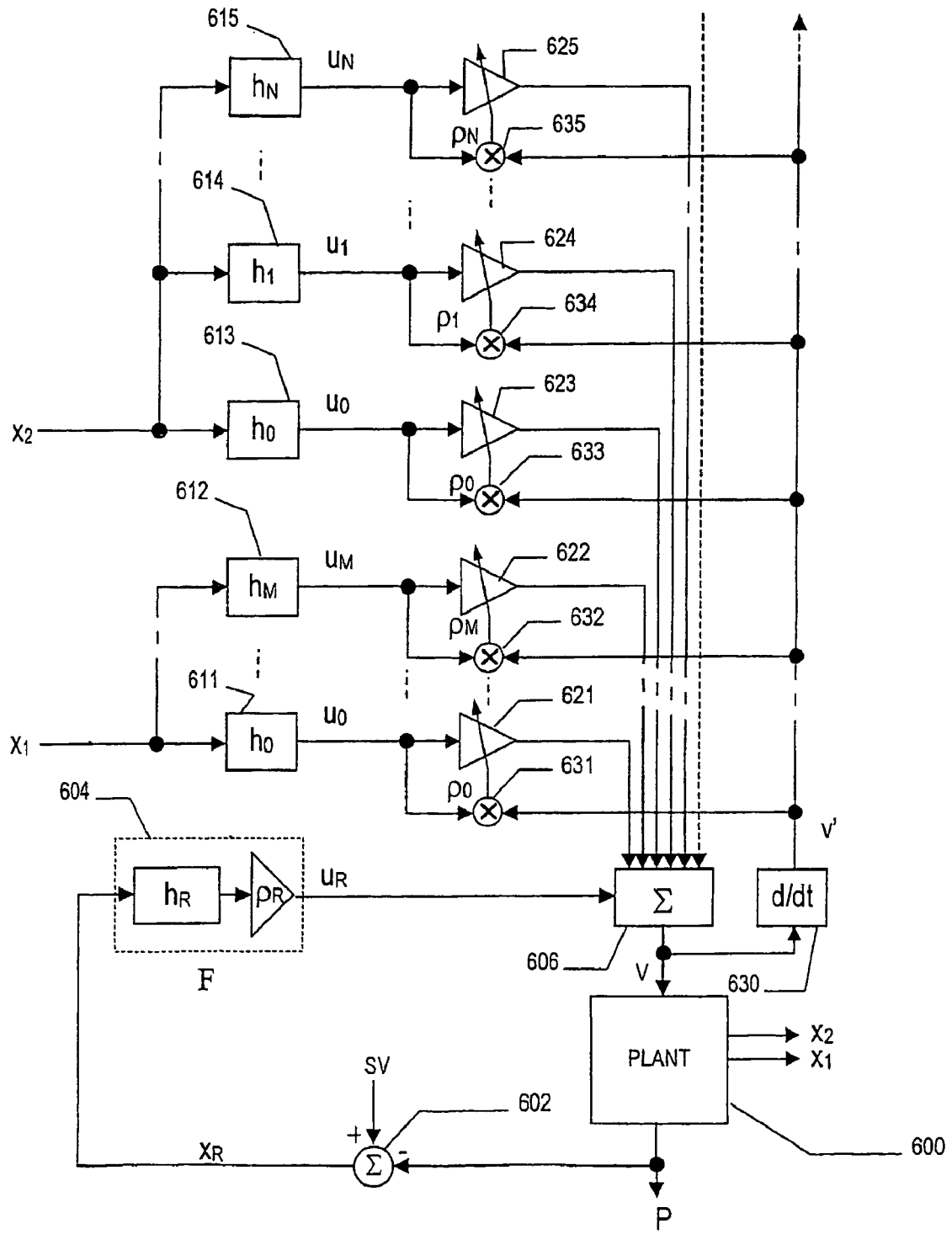
FIG. 6 shows in more detail a multi-stage CMP filter within the control system of FIG. 5.

FIG. 6 shows a process control system using a very simple CMP-filter based controller in addition to conventional error signal $x_R$. Plant 600 is shown emitting the conventional result signal P, and also two disturbances $x_1$, $x_2$. The number of disturbances is not restricted to two. Although these are shown coming from the plant in its broadest sense, they are for the purpose of conventional control systems environmental measurements, whose influence on the process is not exactly known. Subtraction circuit 602 receives the set value signal SV and derives the conventional error signal $x_R$. Feedback filter 604 (with transfer function $F=h_R \times \rho_R$) generates from this a control signal contribution $u_R$ which via summing circuit 606 generates the control value v. This path 600, 602, 604, forms the standard proportional term reference loop of a closed loop control system, and warrants no further description. However, the summing circuit 606 permits many additional contributions to determine the control value v jointly with the conventional term besides $u_R$, each from a disturbance "channel" responsive to one of the disturbance signals $x_1$, $x_2$ etc.

Each disturbance channel comprises a resonator 611-615 with fixed transfer function $h_i$ (fixed impulse response), generating a respective filtered signal $u_i$ accordingly. Each signal $n_i$ passes through a variable gain block 621-625 with gain $\rho_i$ to define the (positive or negative) strength of contribution of that channel in the summing circuit 606. Resonators 611-615 are of a form well known per se, and comprise band-pass filters, which can be implemented in analogue, circuitry as LRC-circuits (inductor, resistor, capacitor) or in digital circuitry as IIR (Infinite Impulse Response) or FIR (Finite Impulse Response) filters. Each input disturbance $x_i$ is processed by at least one resonator channel. The number of channels associated with each disturbance signal is not fixed, and is determined by the known shape of the input waveform and the desired response by the controller to it. In the example illustrated, signal $x_1$ feeds M channels, while signal $x_2$ feeds N channels.

Completing the CMP filter section of the controller shown in FIG. 6 are a differentiator 630, which receives the control output signal v, and individual gain control circuits (GCCs) 631-635, each controlling the gain of a respective gain block 621-625. These GCCs 631-635 provide the learning mechanism of the CMP filter, and will be described in more detail below, with reference to FIG. 8.

Figure 7:
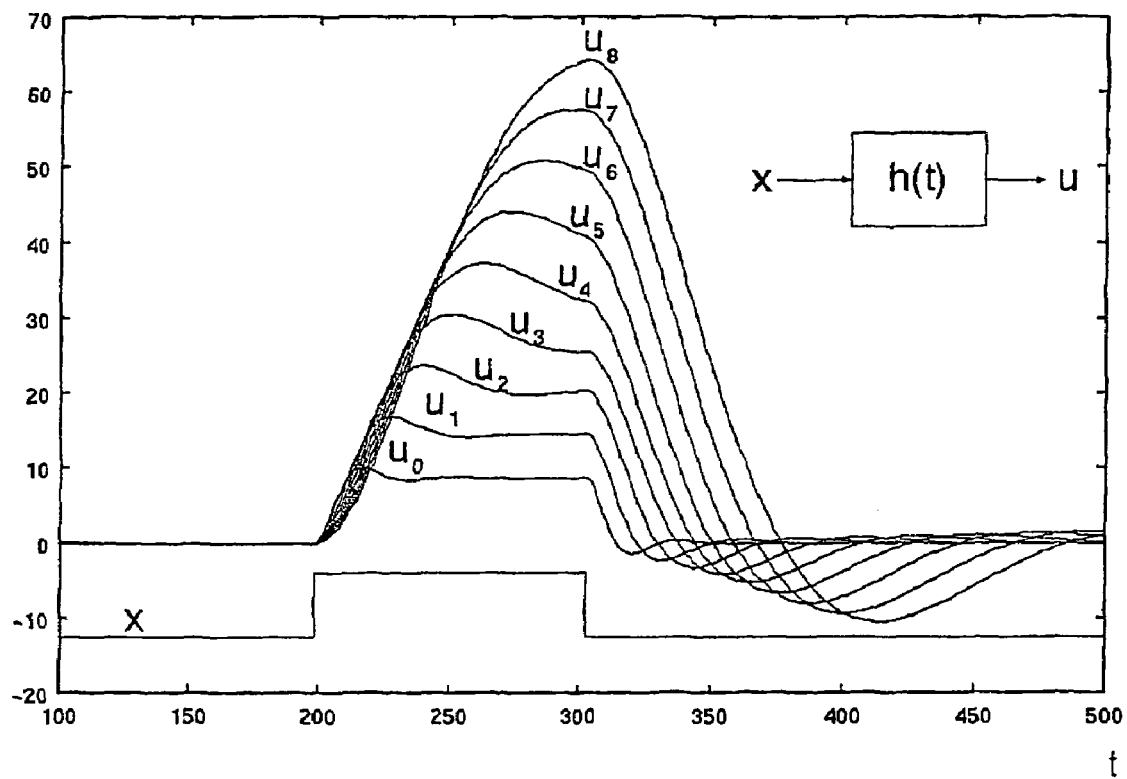
FIG. 7 shows response curves of a set of resonators in a CMP filter of the type shown in FIG. 6, when presented with a square pulse stimulus.

FIG. 7 shows how the resonator responses ($u_0$, $u_1$, $u_2$ etc.) differ, using the example of a square pulse function as input x. For each particular channel the characteristics of its associated resonator 611 etc. are chosen to provide a unique response to each input disturbance. Their resonant frequencies might progress logarithmically (for example $f_0$, $f_0/2$, $f_0/4$ etc.).

The reader should now appreciate that, by providing a suitable set of transfer functions $h_i$ for each disturbance signal any desired response can be synthesised in the summing circuit 606, by varying the relative gains $\rho_i$. This, of course, assumes an infinite number of channels, which is not practical, and assumes that the appropriate response can be identified. Typically, however, fewer than ten resonators for each input would be required for an adequate approximation, perhaps five or fewer. Furthermore, gain control circuits 631-635 set the weights automatically by an adaptive process in the course of operation, to achieve the optimum response without advance knowledge of the desired transfer function, as will now be described.

Figure 8:
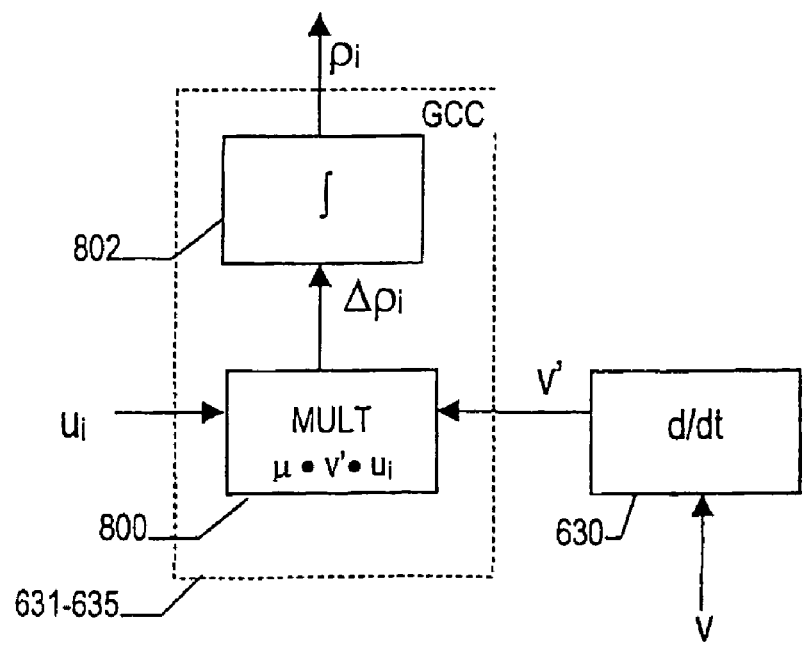
FIG. 8 shows in more detail a gain control circuit (GCC) associated with each resonator in the CMP filter of FIG. 6.

FIG. 8 shows in more detail one of the gain control circuits 631-635 which, together, provide the "learning" mechanism of the controller. Each unit 631-635 in this embodiment provides a multiplier function 800 and an integrator function 802. Differentiator 630, shown again here for clarity, provides the derivative v' of the control variable v as it is continuously output by summing circuit 606. As is well known, the derivative term provides a 90° phase-advanced version of the control signal, and can be regarded theoretically as a predictor of that signal. Differentiator 630 can be implemented using well known technology in analogue form by a differentiator or digitally by subtracting successive samples of the signal, or by a more sophisticated FIR or IIR filter function. Multiplier 800 multiplies together the resonator output $u_i$, a damping factor $\mu$ (typically a small fraction, to avoid instability) and the derivative term v' to derive a measure of the correlation between the resonator output and the derivative v'. This correlation measure $\Delta\rho_i$ is produced continuously (either as an analogue signal or in a digital system as a stream of discrete sample values) and is integrated over time by integrator function 802 to adjust the actual gain $\rho_i$ of the respective gain block 621-625 etc. In a digital embodiment, the integrator function would comprise a simple numerical accumulator.

In combination, the components hereto described provide a controller that (during operation in a new environment) "learns" the relationship between input disturbances and their effect on the process, such that the response by the process to disturbances can be predicted and compensated for in an anticipatory manner, rather than a purely reactive manner. The operation of the CMP filter can be described by the following mathematical equations.

The output, v, of the CMP filter is given as:

$$v(t) = p_R u_R(t) + \sum_{i=1}^{N} p_i u_i(t) \tag{1}$$

where u is given by:

$$u_1(t) = z_1(t) \otimes h_1(t) \tag{2}$$

where x is convolved with h. functions h are the transfer functions of resonators 611 etc given by:

$$h(t) \leftrightarrow H(s) = \frac{1}{(s-p)(s-p^*)} \tag{3}$$

where H(s) describes the resonator in Laplace notation as usual with the two complex/complex-conjugate parameters p and p* given by p=a+ib and p*=a−ib with:

$$a = \frac{\pi f}{Q} \quad b = \sqrt{(2\pi f)^2 - a^2}. \tag{4}$$

where f is the resonant frequency of the relevant resonators 611-615 and Q is their damping factor. (The value of Q is approximately identical to the number of oscillations a resonator will make in response to a δ-function input.) For the purpose of this application Q would preferably be approximately 1, for example lying in the range 0.5-1.2. As discussed earlier, the frequency response depends upon the reaction time required of the controller in a real application. If a CMP filter is used within an electronic control loop, f can be very high (kilohertz to megahertz), if used in a mechanical system f will normally be in the 1-100 hertz range, if used in chemical control situations f can be in the range of millihertz or even lower.

The process of changing the gains associated with each disturbance term $x_i$ is a process of adaptation by a simple variety of neural learning. Each gain setting of the variable gain blocks 621-625 is modified by its respective gain control circuit (GCC) 631-635. All gain control circuits 631-635 are identical (but receive different inputs). On a continuous basis the gain setting $\rho_i$ of each gain control circuit 631-635, with the exception of the reference gain $\rho_R$, is modified by the addition of small (positive or negative) values $\Delta\rho_i$, according to:

$$\rho_i \rightarrow \rho_i + \Delta\rho_i \tag{5a}$$

$$\Delta\rho_i(t) = \mu u_i(t) v'(t) \tag{5b}$$

where μ is a small number typically in the range of 0.000001 to 0.1, which is a damping factor applied to all variable gain blocks 621-625 to prevent too rapid gain changes, and v'(t) is the temporal derivative of v(t) computed by the differentiator 630, which produces a signal in direct proportion and polarity to the rate of change of its input signal. On this basis if the control term v is falling, v' is negative and according to equation (5b) all gain block gain modifiers Δρ will be negative for a positive $u_i$. Therefore the gain values will be falling and the influence of the disturbance signals $x_i$ will be reducing. However, this is only true if the other input to equation (5b), the resonator term, is positive. The disturbance signal may be negative, which would cancel out the negative derivative signal, producing a positive influence. The polarity of the disturbance sensor signals and the signals within the CMP filter are assigned to influence the control loop in a converging manner, otherwise positive feedback would occur, resulting in loop instability.

Figure 9:
FIG. 9 shows relationship between a single resonator output signal $u_i$, a control signal v driving the process and its derivative $v^1$, with respect to time.

FIG. 9 provides waveforms showing the relationship between v, v' and $u_i$ in a case where the particular function $u_i$ is well correlated with a peak in the derivative v'.

As the differentiator operates on only the one term v, it does not need to be 'physically' present in each gain control circuit 631-635, and can exist as a common device 630 as shown in FIG. 6, feeding one result into all channel gain control circuits 631-635. In alternative implementations it may be convenient to combine the differentiation step with the individual GCC functions. In other cases the derivative function may be implicit somewhere in the control system already, and an explicit step would be omitted.

The learning process in a CMP filter based closed-loop control system is a convergent process that will stop by itself (which prevents infinite growth of the gains ρ), settling at the optimum values for the various disturbances. The reason for this is that during the process of adaptation to one or more disturbances $x_i$, the process control variable will adjust to counteract the disturbances $x_i$, and, thus their relative effect will gradually diminish. As a consequence the effect of the disturbances $x_i$ is gradually removed from the process and the gain value(s) $\rho_i$ for each particular disturbance response $u_i$ will settle at its optimum value. Adaptation will continue when a change occurs in a disturbance that is not fully compensated for by the current setting of its associated gain value. The damping factor μ (which need not be the same for each disturbance) effectively sets the number of coincidences that have to be observed in order to constitute a definite correlation.

Figure 10:
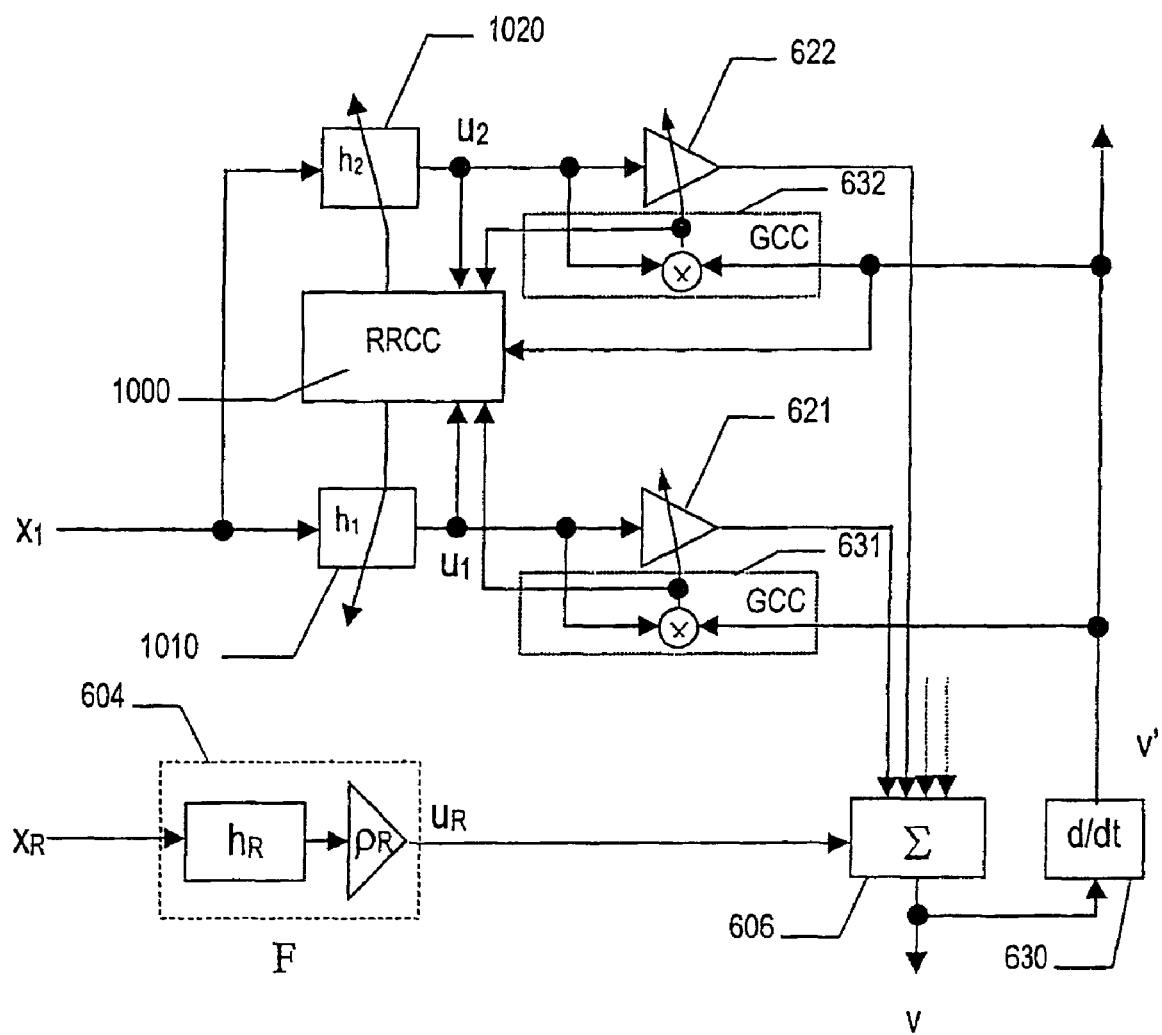
FIG. 10 is a schematic block diagram of an alternative form of CMP filter in which each resonator has a variable frequency response.

FIG. 10 shows a block diagram of a modified CMP filter, whereby in place of multiple fixed resonators, one or more Resonator Response Control Circuits (RRCC) 1000 adjust for disturbance $x_1$ the frequency responses within variable-response resonators 1010, 1020. Primarily this will involve adjusting the resonant frequency, but in principle the Q factor could also be adjusted. The disturbance channel for disturbance $x_2$ comprising variable resonators, variable gain blocks 623 to 625 and gain control circuits 633 to 635 are not shown in this detail. The rest of the components of the CMP filter shown in FIG. 10, such as conventional block 604, summation device 606 and differentiator 630, can operate in the same manner as for the CMP filter of FIG. 6 and therefore warrant no further description.

Using variable-response resonators 1010, 1020 provides the advantage of reducing the number of resonators required to correlate disturbances $x_1$ with the process control term v. Instead of requiring a large quantity of resonators, such as ten, per disturbance the same effect can be achieved using preferably no more than two variable response resonators per disturbance, a disadvantage being that, in addition to increased circuit complexity, the learning process is slightly extended as the variable resonators also have to adjust to match the disturbances. Care must also be taken to preserve control loop stability.

Each Resonator Response Control Circuit (RRCC) 1000 works in the following manner. An indicator of the correlation success for each disturbance is the magnitude of the weight terms from each Gain Control Circuit (GCC) 631, 632. These are used, in co-operation with the output from each channel's resonator $u_i$ and the derivative of the process term v', to modify the frequency response of each variable-response resonator 1010, 1020 in order to maximise the magnitude of the weight terms at the optimum correlation of disturbance to process term v. If more than one variable-response resonator 1010, 1020 is being used per disturbance signal $x_1$, as shown in the example of FIG. 10, then the RRCC (1000) assesses all relevant signals associated with the disturbance to adjust the frequency response of all of the resonators associated with that particular disturbance. Different responses will be chosen for the resonators associated with each disturbance to maximise the correlation windows during the initial periods of learning, with the windows narrowing as learning progresses and optimum settings are achieved.

Figure 11:
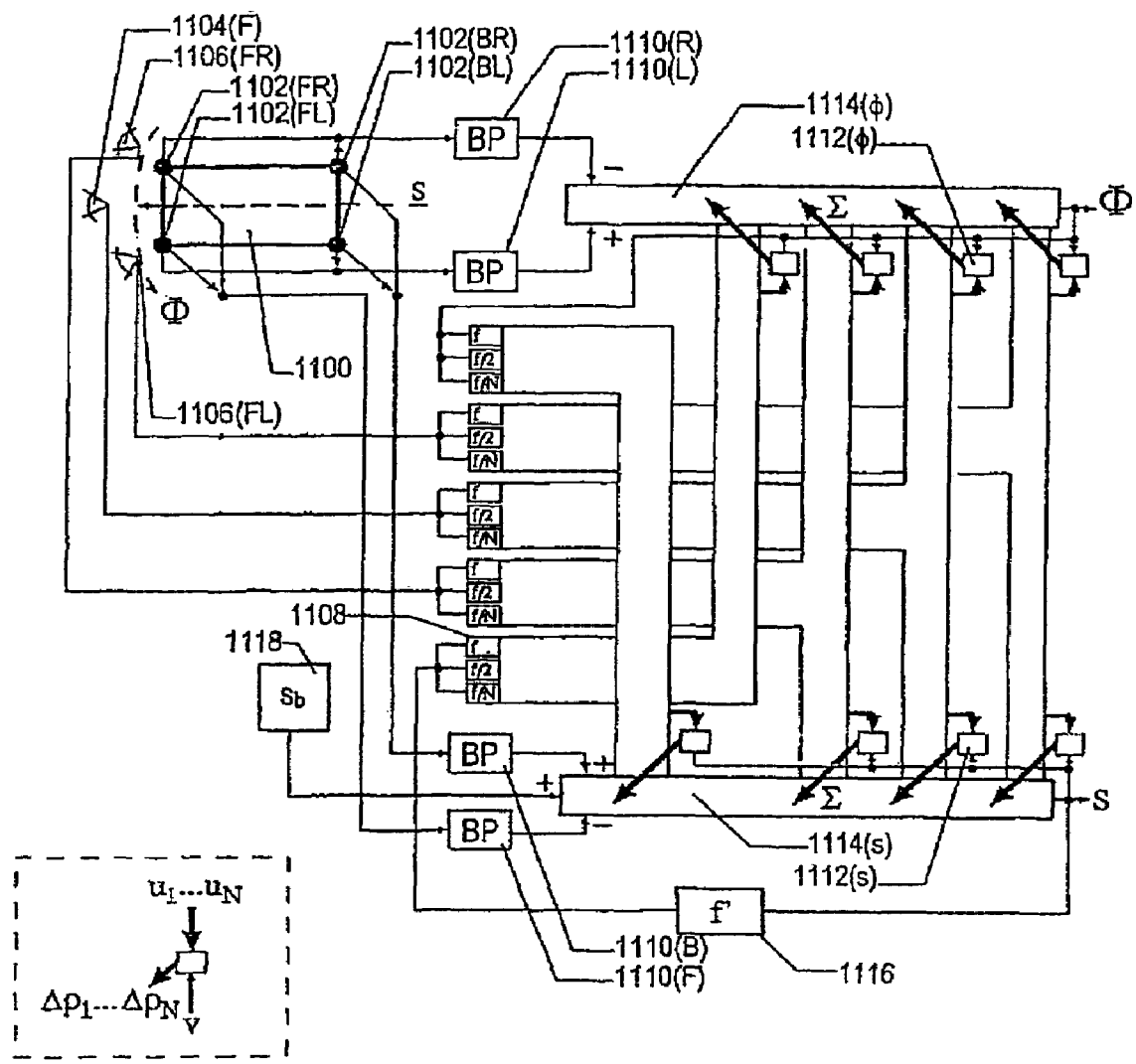
FIG. 11 is a schematic block circuit diagram for a robot control system forming a more specific embodiment of the present invention.

FIG. 11 presents a practical example of a controller for a moving robot 1100, in order to demonstrate the functionality of this invention. For environment sensors the robot employs bump sensors 1102(FL), 1102(FR), 1102(BL), 1102(BR), one on each corner, and three visual range sensors, one forward-looking sensor, 1104(F) and the other two front corner looking sensors 1106(FL), 1106(FR). Sensor suffixes L, R, F, B, used individually or in combination, respectively denote "left", "right", "front" and "back".

In this example a more complex CMP filter-based controller is adopted in the robot control system, whereupon there are two closed loop control systems (φ), (s), that do not operate in isolation, but are closely coupled to one another. There comprises a control loop effecting traction control with output s (speed—within the range forwards/stop/backwards), and a control loop effecting steering control with output φ (within the range left/straight-on/right).

The control system comprises similar components as for previous examples: for each visual (range) disturbance there are corresponding banks of resonators 1108 etc. (in this particular example they are fixed response, but could be variable-response using fewer weights), for each physical (bump) disturbance there are corresponding fixed-response filters 1110(L), 1110(R), 1110(F), 1110(B), Gain Control Circuits 1112(φ), 1112(s) etc. and summation devices 1114(φ), 1114(s). The controller also comprises an additional derivative block f' 1116 and a biasing means 1118, the operation of which is described later. The variable gain blocks 621 of FIG. 6 exist in the robot controller, depicted as a large arrow crossing the bus of the weighted outputs of each resonator bank 1108 etc., as they are input to the summation devices 1114(φ), 1114(s). Bandpass filters 1110(L), 1110(R), 1110 (F), 1110(B), are analogous to the fixed-response blocks 604 of FIG. 6 processing $x_R$. Resonators 1108 etc., GCCs 1112 (φ), 1112(s) etc. and the gain blocks are analogous to the resonators 611 etc., GCCs 631 etc. and variable gain blocks 621 etc. of FIG. 6 processing disturbance signals $x_1, x_2$, etc. Three representative channels with responses f, f/2, f/N are shown for each disturbance.

It is readily apparent that the 'circuit' shown could be implemented entirely in digital form or entirely in analogue form, in any mix of these, and in any mixture of hardware and software, as appropriate.

During its initial negotiation of any obstacles the robot 1100 will initially use its bump sensors 1102 to inform the control system of the boundaries in which it is operating, using reverse and steering to negotiate past each obstacle. The visual range sensors 1104(F), 1106(FL), 1106(FR), potentially inform the control system of an imminent collision, but the control system initially will not have learnt the association between the visual stimuli and a bump signal that occurs temporally slightly later. Once the CMP-filter has learnt that a relationship exists between the two, the robot closed loop control system will be capable of modifying the control paths associated with traction s and especially steering $\phi$ by the direct influence of the visual sensors 1104(F), 1106(FL), 1106(FR), steering the robot 1100 away from an obstacle before it hits it.

The signal from each bump sensor 1102(FL), 1102(FR), 1102(BL), 1102(BR), is fed into both control loops. The front bump sensors 1102(FL), 1102(FR) are coupled together as a negative signal into the speed (s) control loop for reverse speed control and the back bump sensors 1102(BL), 1102 (BR) are coupled together as a positive signal into the speed (s) control loop for forward speed control. An additional biasing means 1118 is fed into the same speed (s) control loop to set a non-zero speed so that an unstimulated robot moves at a constant forward speed until it receives a signal from an environment sensor 1102(FL), 1102(FR), 1102(BL), 1102(BR), 1104(F), 1106(FL), 1106(FR). In the same manner as for speed control, the right-hand side bump sensors 1102(FR), 1102(BR) are coupled together as a negative signal into the steering ($\phi$) control loop for left direction control and the left-hand side bump sensors 1102(FL), 1102 (BL) are coupled together as a positive signal into the steering ($\phi$) control loop for right direction control. An unstimulated robot will move straight-ahead until it receives a signal from an environment sensor. It will be appreciated that a robot having a real job to do will be given additional stimuli to indicate desired changes in speed and direction, which will influence the controller in combination with the sensor inputs illustrated here. In the present application, the resonators for the bump sensor signals are given a relatively low Q, such as 0.6, to provide high damping and avoid "overshoot" in their response (after a bump the robot should reverse, and not oscillate back and forward).

The forward, left and right looking range sensors 1104(F), 1106(FL), 1106(FR) are fed into their own dedicated banks of resonators 1108 whose outputs feed into both control loops s, $\phi$. Finally, control loop cross-coupling is achieved by taking each output control variable s and $\phi$ (from the summation devices) and feeding it respectively into a bank of resonators feeding into the other control loop. In the case of the speed control influencing the steering ($\phi$) control, its derivative f' is first taken to remove the offset from the speed constant bias 1112. Without control loop cross-coupling the CMP filter would not be able to relate a change in speed with a change in direction and a change in direction with a change in speed. This ensures that when reversing the robot modifies its steering to traverse in a tight arc away from an obstacle it has just collided with until the visual sensor indicates that it no longer sees the obstacle, and to also ensure that the speed is reduced when performing tight steering arcs.

Ideally the visual sensors will always be able to steer the robot away from obstacles, and the bump sensors would therefore never be activated, but in reality the robot will still have the potential to get into situations that it cannot steer out of. In these cases the bump sensors 1102 will still be required, but more as a secondary sensor, rather than the primary sensor they were at the beginning of the learning process. Some typical situations might be driving into a darkened dead-end passage, or when reversing and hitting an obstacle (there are no reversing visual sensors in this example, although the skilled reader will appreciate that this could be achieved with the addition of further sensor and control terms).

Traditionally, in order to negotiate obstacles the robot would have had to have been taught various parameters relating to the environment. The present invention only needs to be configured with control loop parameters that ensure that the control of the robot is smooth, such as resonator responses that are tailored to the visual sensor outputs. None of the parameters are environmental, but associated with the design of the robot. They are only set at the point of design of the robot and need no further adjustment. In contrast, a traditional robot would need to be taught new parameters associated with every new environment in which it has to operate. The novel controller would allow a robot to be placed in differing environments without needing any adjustment, and also adapts its response as the mechanism of the robot wears, or the nature of the environment changes.

Figure 12:
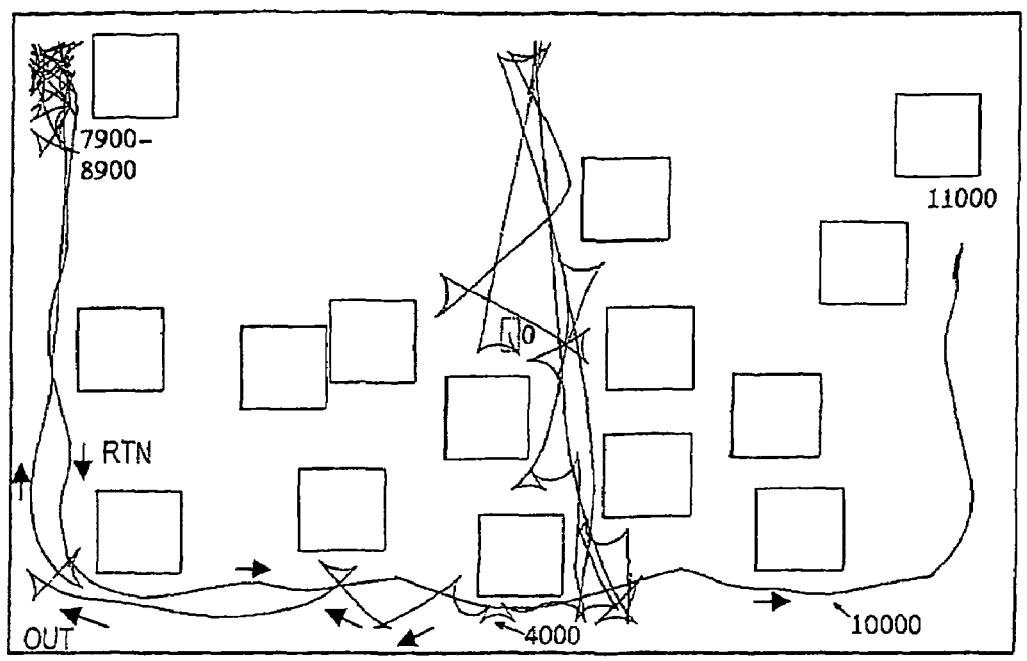
FIG. 12 is a simulation of the path of the robot under control of the circuit of FIG. 11 as it encounters obstacles in an environment over a period of time.

Referring to FIG. 12, one can see the robot (simulated here on a computer) traversing a "maze" full of obstacles, starting at point "0" and finishing at '11000' (time steps, of arbitrary value). As the robot negotiates obstacles, the CMP filters adjust to provide a relationship between visual sensing, steering and speed. One can see that the number of collisions gradually reduces, to the point that the robot manages to traverse long distances without any collisions, in particular from the top-left corner (time steps 7900-8900) to the end point. Small steering corrections can be seen where the visual sensor has indicated an impending collision, causing the steering loop to adjust in advance, steering the robot away from the obstacle. In the lower-left corner, where the result of learning is most noticeable, the outward path is labelled OUT and the return path, later in time, is labelled RTN. Upon close inspection one can see that the robot is considerably more capable of steering without bumping into obstacles after the period 7900-8900 spend in the top left-hand corner. This is due to the amount of learning the control system has achieved during that period, as the robot has had to bump a large number of obstacles to be able to steer out of the corner.

Figure 13:
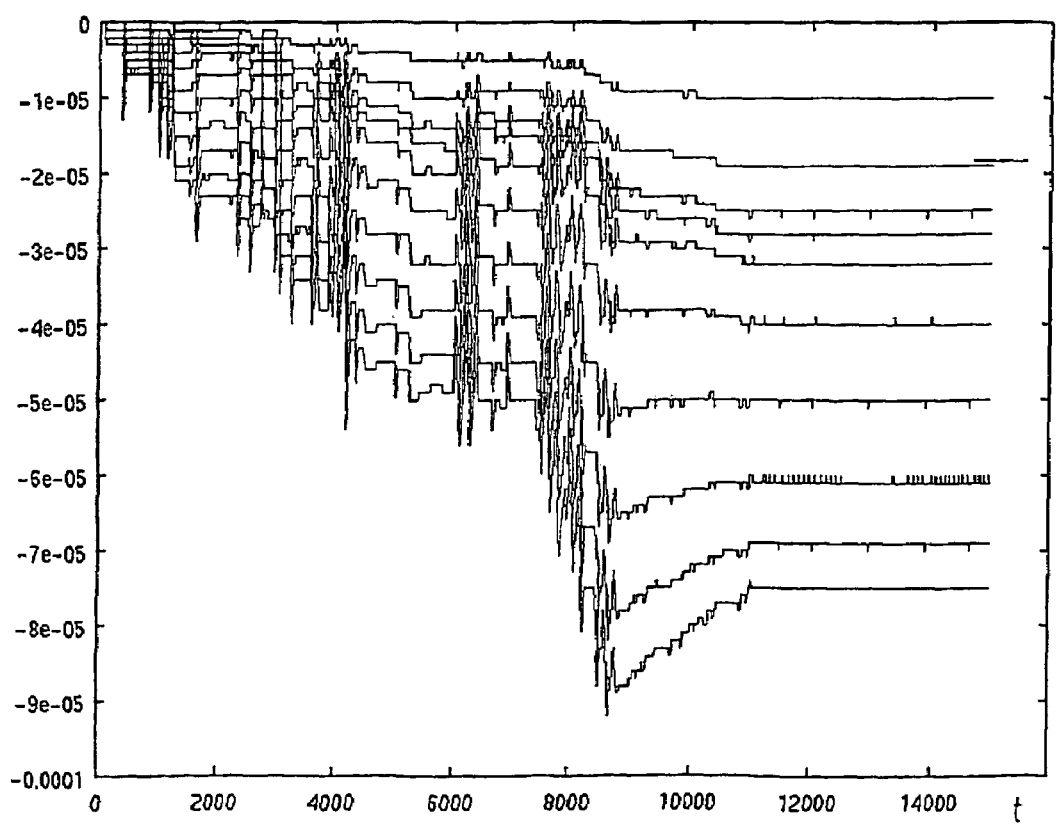
FIG. 13 illustrates the learning of optimum resonator weights for one disturbance signal within the robot circuit during the time period represented in FIG. 12.

Referring to FIG. 13, one can observe the rate of change in resonator weightings is significantly higher during the robot's period 7900-8900 in the corner than at any other time during its journey. This shows a set of ten weightings $\rho_i$ for ten resonators associated with the left-hand range sensor 1106 (FL) as it affects the steering control variable $\phi$. Considering all sensors and the cross-correlation paths between $\phi$ and s, it will be appreciated that the example circuit as a whole might "employ 5×10=50 resonators". 1108 and 8×10=80 individual Gain Control Circuits (GCCs) 1112($\phi$), 1112(s) etc. One can also observe that the weightings continue to alter slowly after step 9000, even when there are no collisions. This is the learned mutual influence of the outputs from solely the visual sensors, adjusting the weightings to their optimum settings.

The sensors used to effect environmental sensing could equally well be provided using different sensor technologies, such as ultrasonic range sensors, image processing visual sensors, radiation sensors, electromagnetic field sensors, radar sensors etc, the method by which the robot senses its environment not being essential to the novel invention.

The methodology used to effect robot control could equally well be utilised in other applications, such as a chemical plant where, for example, the disturbance signals are pressure and temperature and the control terms are flow rate and heat control.

The method by which the CMP filter-based robot achieves optimised weights associated with each disturbance is not restricted to a "learning" process. The "learning" may have been achieved by another robot and the "learnt" parameters passed over as a starting condition to an "unlearnt" robot, such that the "unlearnt" robot can immediately negotiate a "maze" of obstacles. The CMP-based filter robot may be capable of further adapting the weights associated with each disturbance as time progresses to allow the robot to adapt to changes such as a different environment or physical degradation, or may employ fixed weights as a lower cost solution, at the expense of loss of adaptability to changing environments or physical degradation of the robot.

The skilled reader will appreciate that numerous variations are possible within the principles of the apparatus described above. More or fewer strategies may be tried, and variations on each can be provided within the rule sets.

Accordingly it will be understood that the embodiments illustrated herein are presented as examples to aid understanding, and are not intended to be limiting on the spirit or scope of the invention claimed.

The invention claimed is:

1. A controller, comprising:
   circuitry to receive a first input signal representative of a measured state of an apparatus;
   circuitry to generate a control signal to alter the measured state of the apparatus to maintain a desired state;
   circuitry to receive a second input signal representing at least one additional measurement of the state of the apparatus;
   circuitry to correct said generated control signal in response to said second signal; and
   circuitry to condition said corrected control signal based at least in part on temporal cross-correlation between said second input signal and said generated control signal.

2. The controller of claim 1, wherein said circuitry to generate a control signal comprises signal processing circuitry.

3. The controller of claim 1, wherein the circuitry to condition comprises signal conditioning circuitry.

4. The controller of claim 3, wherein the signal conditioning circuitry comprises circuitry to adjust a gain of an output of said circuitry to correct said generated control signal.

5. The controller of claim 3, wherein the signal conditioning circuitry comprises circuitry to adjust a frequency response of an output of said circuitry to correct said generated control signal.

6. The controller of claim 1, wherein said circuitry to correct said generated control signal further comprises:
   circuitry to filter said second input signal via a plurality of filters having different fixed impulse responses; and
   circuitry to form a weighted sum of the filtered signal to determine a correction to the control signal.

7. The controller of claim 6, wherein said circuitry to correct said generated control signal further comprises one or more filter components.

8. The controller of claim 1, wherein said first input signal comprises a measurement signal.

9. The controller of claim 8, wherein said measurement signal comprises a derivative of a control signal.

10. The controller of claim 1, wherein said response of said circuitry to correct comprises a fixed response.

11. The controller of claim 1, wherein said response of said circuitry to correct comprises a non-zero response.

12. An apparatus, comprising:
   means for receiving a primary input signal representing a measured state of the apparatus;
   means for generating a control signal to alter the state of the apparatus in response to said primary input signal;
   means for receiving at least one further input signal representing one or more additional measurements of the apparatus;
   means for including corrections in said control signal in response to said additional measurement signal; and
   means for conditioning the corrected control signal of said means for including corrections based at least in part on temporal cross-correlation between said additional measurement signal and said control signal.

13. The apparatus of claim 12, further comprising:
   means for filtering the at least one further input signal by employing fixed impulse responses.

14. The apparatus of claim 12, wherein the means for conditioning begins from a zero condition.

15. The apparatus of claim 12, wherein the means for conditioning begins with a non-zero set of conditions.

16. The apparatus of claim 12, wherein said at least one further input signal comprises a disturbance signal.

17. A controller, comprising:
   means for receiving an input signal;
   means for generating a control signal based at least in part on said input signal;
   means for receiving a disturbance signal; and
   means for conditioning the control signal based at least in part on temporal cross-correlation between said control signal and said disturbance signal.

18. The controller of claim 17, further comprising means for filtering at least a portion of said input signal and said disturbance signal.

19. The controller of claim 17, wherein the means for conditioning begins from a zero condition.

20. The controller of claim 17, wherein the means for conditioning begins with a non-zero set of conditions.

21. The controller of claim 17, further comprising:
   means for receiving a plurality of disturbance signals;
   means for filtering at least a portion of the disturbance signals; and
   means for generating a summed disturbance signal based at least in part on said filtering.

22. A controller, comprising:
   an input to receive at least an input signal and a disturbance signal;
   circuitry to generate a control signal in accordance with said input signal; and
   circuitry to condition the control signal based at least in part on temporal cross-correlation between said control signal and said disturbance signal.

23. The controller of claim 22, wherein said controller is further adapted to filter at least a portion of said input signal and said disturbance signal via a plurality of filter functions.

24. The controller of claim 23, wherein at least a portion of said filter functions comprise predictive filter based functions.

25. The controller of claim 23, wherein at least a portion of said filter functions comprise cross-modal predictive filter based functions.

26. The controller of claim 22, wherein the conditioning is based at least in part on a zero condition.

27. The controller of claim 22, wherein the conditioning is based at least in part on a non-zero set of conditions.

28. A system, comprising:
   a controlled apparatus;
   circuitry to receive a first and second signal representative of a set value of the apparatus and a measured value of the apparatus respectively;

circuitry to compare the first and second signal to generate an error signal;
circuitry to generate a control signal for the controlled apparatus in response to said error signal;
circuitry to receive at least one disturbance signal; and
circuitry to condition the control signal based at least in part on temporal cross-correlation between said control signal and said at least one disturbance signal.

29. The system of claim 28, wherein said circuitry to generate a control signal comprises signal processing circuitry.

30. The system of claim 28, wherein said circuitry to condition the control signal comprises signal conditioning circuitry.

31. The system of claim 30, wherein the signal conditioning circuitry further comprises circuitry to adjust a gain of said disturbance signal.

32. The system of claim 30, wherein the signal conditioning circuitry further comprises circuitry to adjust a frequency response of said disturbance signal.

33. The system of claim 30, wherein the signal conditioning circuitry further comprises filter based circuitry including one or more filter components.

34. The system of claim 33, wherein at least a portion of said filter components comprise predictive filters.

35. The system of claim 33, wherein at least a portion of said filter components comprise cross-modal predictive filters.

36. The system of claim 28, wherein said controlled apparatus comprises a physical plant.

37. The system of claim 28, wherein said controlled apparatus comprises a robot.

38. The system of claim 28, wherein said controlled apparatus comprises an economic system.

39. A robot comprising:
one or more sensors adapted to generate one or more measurement signals; and
a controller, said controller being adapted to:
receive a state signal representative of a state of said robot;
generate an error signal based, at least in part, on at least one of said measurement signals and said state signal;
generate a control signal based, at least in part, on said error signal; and
condition the control signal based at least in part on temporal cross-correlation between said control signal and said at least one of said measurement signals,
wherein said robot is adapted to change said state in response to said control signal.

40. The robot of claim 39, wherein said one or more sensors comprise at least one bump sensor.

41. The robot of claim 39, wherein said one or more sensors comprise at least one forward-looking sensor.

* * * * *